United States Patent [19]

Hitomi et al.

[11] Patent Number: 4,889,082
[45] Date of Patent: Dec. 26, 1989

[54] INTAKE SYSTEM FOR MULTIPLE-CYLINDER ENGINE

[75] Inventors: Mitsuo Hitomi; Yasuhiro Yuzuriha; Toshihiko Hattori; Akinori Yamashita, all of Hiroshima, Japan

[73] Assignee: Mazda Motor Corporation, Hiroshima, Japan

[21] Appl. No.: 250,413

[22] Filed: Sep. 28, 1988

[30] Foreign Application Priority Data

Oct. 1, 1987 [JP] Japan ............... 62-248368

[51] Int. Cl.$^4$ ............................ F02B 27/00
[52] U.S. Cl. .................. 123/52 M; 123/52 MC
[58] Field of Search ......... 123/52 M, 52 MB, 52 MV, 123/308, 302, 432, 52 MC, 52 ML

[56] References Cited

U.S. PATENT DOCUMENTS

| | | | |
|---|---|---|---|
| 4,440,120 | 4/1984 | Butler | 123/52 MV |
| 4,649,871 | 3/1987 | Hatamura et al. | 123/52 MV |
| 4,708,097 | 11/1987 | Hatamura et al. | 123/52 MV |
| 4,736,714 | 4/1988 | Hokazono et al. | 123/52 M |
| 4,738,229 | 4/1988 | Wada et al. | 123/52 MV |
| 4,766,853 | 8/1988 | Iwanami | 123/52 M |

FOREIGN PATENT DOCUMENTS 56-52522 5/1981 Japan .
60-14169 4/1985 Japan .
0241418 10/1986 Japan ............... 123/52 M Primary Examiner—David A. Okonsky
Attorney, Agent, or Firm—Sixbey, Friedman, Leedom & Ferguson

[57] ABSTRACT

An intake system for a multiple-cylinder engine has first and second branch passages, a plurality of discrete intake passages for connecting the cylinders to one of the first and second branch passages, an intake air supply passage, an upstream side communicating passage for communicating the first and second branch passages with each other and with the downstream end of the intake air supply passage, and a downstream side communicating passage for communicating the downstream side ends of the first and second branch passages with each other. The firing order is set so that the cylinders connected to each of the branch passages do not fire one after another. The first and second branch passages and the upstream side and downstream side communicating passages forming a circular passage for supercharging the engine by resonance tuning effect of intake air. The downstream side communicating passage is provided with a cross-sectional area changing means for changing the effective cross-sectional area of the downstream side communicating passage according to the engine speed to increase the effective cross-sectional area of the downstream side communicating passage with increase in the engine speed.

6 Claims, 7 Drawing Sheets

INTAKE SYSTEM FOR MULTIPLE-CYLINDER ENGINE

BACKGROUND OF THE INVENTION

1. Field of the Invention

This invention relates to an intake system for a multiple-cylinder engine, and more particularly to an intake system for a multiple-cylinder engine which is arranged to be supercharged by a resonance tuning effect of intake air.

2. Description of the Prior Art

There have been known various multiple-cylinder engines which are arranged to increase the volumetric efficiency, thereby increasing the engine output torque, by kinetic effect of intake air. For example, in the multiple-cylinder engine disclosed in Japanese Patent Publication No. 60(1985)-14169, the cylinders are divided into first and second cylinder groups so that the cylinders in each cylinder group do not fire one after another, and the cylinders in the first and second cylinder groups are respectively connected to first and second intake passages each of which comprises an enlarged volume chamber to which discrete intake passages are connected at the upstream side ends and a resonance intake passage connected to the enlarged volume chamber. The upstream end of each resonance intake passage is communicated with an upstream side junction, and the enlarged volume chamber is provided with a switching means for selectively bringing the first and second intake passages into communication with each other and interrupting communication therebetween. When communication between the first and second intake passages is interrupted, negative pressure waves generated by the intake strokes in each cylinder are reflected at the upstream side junction into positive pressure waves, and an inertia supercharging effect is obtained by the positive pressure waves in a relatively low engine speed range. On the other hand, when the first and second intake passages are communicated with each other, the negative pressures are reflected nearer the intake port than when communication between the intake passages is interrupted, whereby the natural frequency of the intake pressure oscillation is increased, and an inertia supercharging effect is obtained in a high engine speed range.

In Japanese Unexamined Patent Publication No. 59(1984)-565, it is proposed to supercharge an engine with a compact intake manifold by providing between left and right cylinder banks of a V-type engine a plenum type intake manifold which has an outer wall having an internal space and a plurality of ram type intake pipes disposed in the internal space of the outer wall to annularly extend along the outer wall and connected to the respective intake ports at the downstream ends.

Further, supercharging can be effected by resonance tuning effect by connecting the cylinders in each cylinder group (the cylinders in which do not fire one after another) to an intake passage having no enlarged volume chamber like a surge tank and by selecting the length of the intake passage so that the resonant frequency of intake air in the intake passage conforms to a particular engine speed range.

When supercharging an engine utilizing resonance of intake air in the resonance intake passage, the resonance frequency of intake air is determined mainly depending upon the effective length of the resonance intake passage. Accordingly, in order to obtain an excellent supercharging by resonance tuning effect of intake air in an low engine speed range, the intake passage must be long, which is not preferable in view of making the engine compact.

The supercharging effect can be obtained in a wide engine speed range from the low engine speed range to the high engine speed range by providing a plurality of resonance intake passages having different effective lengths and switching the resonance intake passages according to the engine speed. However, though peaks of engine output torque can be obtained in certain engine speed ranges corresponding to the lengths of the resonance intake passages, the engine output torque cannot be increased in the remaining engine speed range and accordingly, engine output torque properties in which the torque smoothly increases from the low engine speed range to the high engine speed range cannot be obtained.

SUMMARY OF THE INVENTION

In view of the foregoing observations and description, the primary object of the present invention is to provide an intake system for a multiple-cylinder engine which can smoothly increase the engine output torque from the low engine speed range to the high engine speed range by a resonance tuning effect of intake air, and at the same time, enables sufficiently compact arrangement of the engine.

The present invention is based on the fact that the resonance frequency of the intake air can also be changed by changing the cross-sectional area of the resonance passage without changing the length of the resonance passage. That is, as the cross-sectional area of the resonance passage reduces, the resistance to the pressure wave increases and the velocity of propagation thereof is lowered, whereby the resonance frequency is shifted toward the low engine speed range side. Accordingly, by changing the cross-sectional area of the resonance passage according to the engine speed, the peak of the engine output torque can be shifted according to the engine speed, thereby obtaining smooth torque characteristics.

That is, the intake system for a multiple-cylinder engine of the present invention comprises first and second branch passages, a plurality of discrete intake passages for connecting the cylinders to one of the first and second branch passages, an intake air supply passage, an upstream side communicating passage for communicating the first and second branch passages with each other and with the downstream end of the intake air supply passage, and a downstream side communicating passage for communicating the downstream side ends of the first and second branch passages with each other, the firing order being set so that the cylinders connected to the first branch passage by way of the respective discrete passages do not fire one after another and the cylinders connected to the second branch passage by way of the respective discrete passages do not fire one after another, and the first and second branch passages and the upstream side and downstream side communicating passages forming a circular passage for supercharging the engine by resonance tuning effect of intake air, and characterized in that said downstream side communicating passage is provided with a cross-sectional area changing means for switching the effective cross-sectional area of the downstream side communicating passage among at least a full closed state, a part opening state and a full opening state according to the engine speed to increase the effective cross-sectional area of the downstream side communicating passage with increase in the engine speed.

In accordance with the present invention, the resonance tuning frequency is changed according to the engine speed by changing the cross-sectional area of the circular passage. This is advantageous in compactly arranging the engine over an intake system in which the resonance tuning frequency is changed by changing the length of the intake system. Further, the cross-sectional area changing means is disposed in the downstream side communicating passage in present invention. This is advantageous over the case where such means is disposed in the upstream side communicating passage in that flow of intake air introduced through the intake supply passage and the upstream side communicating passage is not affected by operation of such means.

DESCRIPTION OF THE PREFERRED EMBODIMENTS

Figure 1:
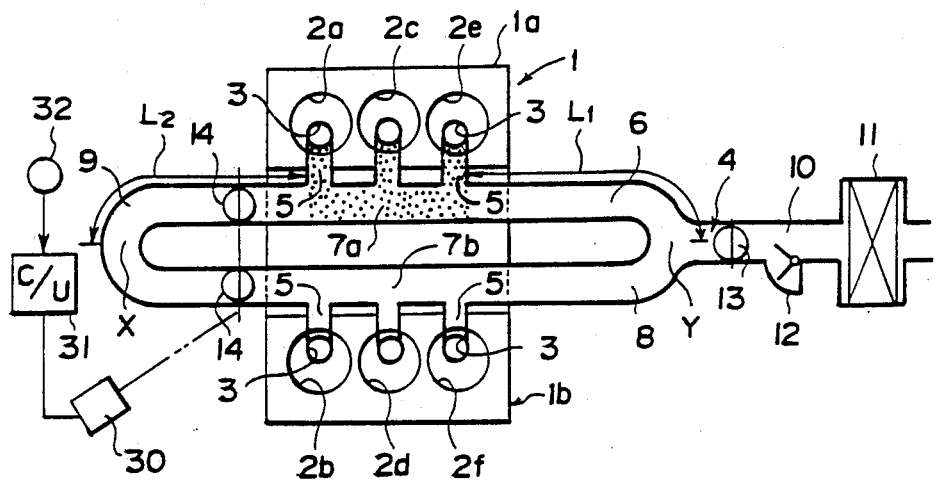
FIG. 1 is a schematic view showing a V-6 engine provided with an intake system in accordance with an embodiment of the present invention.

In FIG. 1, a V-6 engine having a fuel injection system (not shown) is provided with No. 1 to No. 6 cylinders 2a to 2f which fire in this order. No. 1, No. 3 and No. 5 cylinders 2a, 2c and 2e are formed in a first cylinder bank 1a and No. 2, No. 4 and No. 6 cylinders 2b, 2d and 2f are formed in a second cylinder bank 1b. That is, the cylinders in each cylinder bank do not fire one after another.

Each of the cylinders 2a to 2f is provided with an intake port 3 and an exhaust port (not shown), and the intake ports 3 of the respective cylinders 2a to 2f are connected to an intake passage 4. The intake passage 4 has no enlarged volume chamber such as a surge tank and comprises an intake air supply passage 10 for introducing intake air by way of an air cleaner 11, an airflow meter 12 and a throttle valve 13, a circular passage 6 connected to the downstream end of the intake air supply passage 10, and discrete intake passages 5 for communicating the respective cylinders 2a to 2f with the circular passage 6.

The circular passage 6 comprises a first branch passage 7a to which the discrete intake passages 5 for the cylinders in the first cylinder bank 1a are connected, a second branch passage 7b to which the discrete intake passages 5 for the cylinders in the second cylinder bank 1b are connected, an upstream side communicating passage 8 which connects the upstream side ends of the first and second branch passages 7a and 7b and is connected to the downstream end of the intake air supply passage 10 at the middle between the upstream side ends of the first and second branch passages 7a and 7b, and a downstream side communicating passage 9 which connects the downstream side ends of the first and second branch passages 7a and 7b. Both the upstream side communicating passage 8 and the downstream side communicating passage 9 are longer than the passage length between junctions of adjacent discrete intake passages 5 for the cylinders in each cylinder bank to the corresponding branch passage 7a or 7b, e.g., the passage length between No. 1 cylinder 2a and No. 3 cylinder 2c. A positive pressure wave generated near the intake port 3 for each cylinder in the each cylinder bank at the end of the intake stroke is propagated along the circular passage 6 in opposite directions and acts on the intake ports for the other cylinders in the same cylinder bank, thereby supercharging the cylinders by resonance tuning effect of intake air.

A pair of butterfly valves 14 are provided in the downstream side communicating passage 9 of the circular passage 6, one near the junction of the downstream side communicating passage 9 to the first branch passage 7a and the other near the junction of the same to the second branch passage 7b. The butterfly valves 14 are opened and closed in synchronization with each other by an actuator 30 according to the engine speed under the control of a control unit 31 which receives a signal from an rpm sensor 32.

When the engine speed is in a low engine speed range, the control unit 31 fully closes the butterfly valves 14. In this state, negative pressure wave generated near the intake port 3 for each cylinders in each cylinder bank at the beginning of the intake stroke of the corresponding cylinder propagates upstream through the upstream side communicating passage 8 and is reflected into positive pressure wave at the junction of the circular passage 6 to the intake air supply passage 10, and the positive pressure wave acts on the same cylinder at the end of the intake stroke to supercharge the cylinder by inertia effect of intake air.

Figure 2:
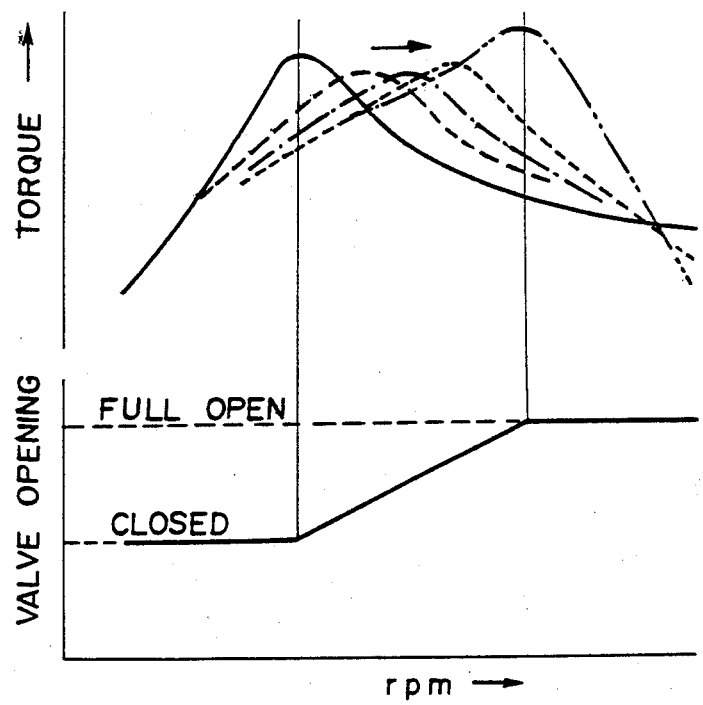
FIG. 2 shows a relation between the opening of the butterfly valves and the engine speed, and a relation between the engine output torque and the engine speed in the engine shown in FIG. 1.

When the engine speed becomes higher than a predetermined value, the control unit 31 opens the butterfly valves 14. When the butterfly valves 14 are opened, a positive pressure wave generated near the intake port 3 for each cylinder in the each cylinder bank i propagated along the circular passage 6 through the upstream side communicating passage 8 and the downstream side communicating passage 9 in opposite directions and acts on the intake ports for the other cylinders in the same cylinder bank, thereby supercharging the cylinders by resonance tuning effect of intake air. The opening of the butterfly valves 14, i.e., the cross-sectional area of the circular passage 6, is increased as the engine speed increases from the low engine speed range to a high engine speed range. As the cross-sectional area of the circular passage 6 changes, the resistance to the intake air pressure wave propagating through the circular passage 6 changes, whereby the velocity of propagation of the pressure wave changes or the propagation time changes. That is, as the cross-sectional area of the circular passage 6 reduces, the resistance to the pressure wave increases and accordingly the propagation time of the pressure wave is elongated, whereby the resonance tuning frequency of intake air is lowered. On the other hand, as the cross-sectional area of the circular passage 6 increases, the propagation time of the pressure wave is shortened and the resonance tuning frequency of intake air becomes high. Thus the resonance tuning frequency of intake air changes with change of the opening of the butterfly valve and the peak of the engine output torque by the resonance tuning effect continuously changes with the engine speed as shown in FIG. 2, and it seems as if a torque curve having a predetermined peak level shifts with change of the engine speed. That is, smooth and high engine torque properties having no valley from the low engine speed range to the high engine speed range.

In order to compactly arranging the engine, it is important to size each discrete intake passage 5 not to produce an inertia tuning effect in the working engine speed range. For this purpose, the inertia tuning engine speed $N_I$ of each discrete intake passage is set to be higher than the maximum engine speed Nmax. The inertia tuning engine speed $N_I$ of each discrete intake passage 5 is represented by the following formula.

$$N_I = \theta \cdot \frac{v}{6}, \text{ wherein } v = \frac{a}{2\pi} \sqrt{\frac{f}{l \cdot V_{n'}}} \quad \theta \text{ represents the}$$

$\theta$ represents the intake valve opening time, v represents the natural frequency, a represents the sonic speed, f represents the mean cross-sectional area of the discrete intake passage, represents the mean length of the discrete intake passage, and Vm represents the mean volume of the combustion chamber during the intake stroke.

Further, in order to obtain high engine output by resonance tuning effect at the maximum engine speed Nmax, it is preferred that the shorter passage resonance tuning engine speed $N_R$ when the butterfly valves 14 are fully opened be lower than 1.2×Nmax and higher than 0.7×Nmax, the shorter passage resonance tuning engine speed $N_R$ being defined in this specification as the resonance tuning engine speed of the shorter one of the passage between the junction of the upstream-most discrete passage in one of the cylinder banks to the corresponding branch passage (7a or 7b) and the junction Y of the circular passage 6 to the intake air supply passage 10 and the passage between the junction of the downstream-most discrete passage in the cylinder bank to the same branch passage and the middle X of the downstream side communicating passage 9, the former being indicated at L1 and the latter being indicated at L2 in FIG. 1. The shorter passage resonance tuning engine speed $N_R$ is represented by the following formula.

$$N_R = 120 \times v_R/m,$$

wherein $v_R$ represents the resonance natural frequency and is equal to $a/4 \times [1/(V_R/F+L+D)]$, L, F and D respectively represent the length, the mean cross-sectional area and the mean diameter of the shorter one of said passages, m represents the number of the cylinders in each cylinder bank, and $V_R$ represents the volume of the dotted portion in FIG. 1, i.e., the volume of the intake passage between the junction of the upstream-most discrete intake passage to the branch passage and the junction of the downstream-most discrete intake passage to the branch passage including the volume of all the discrete intake passages connected to the branch passage.

Figure 3:
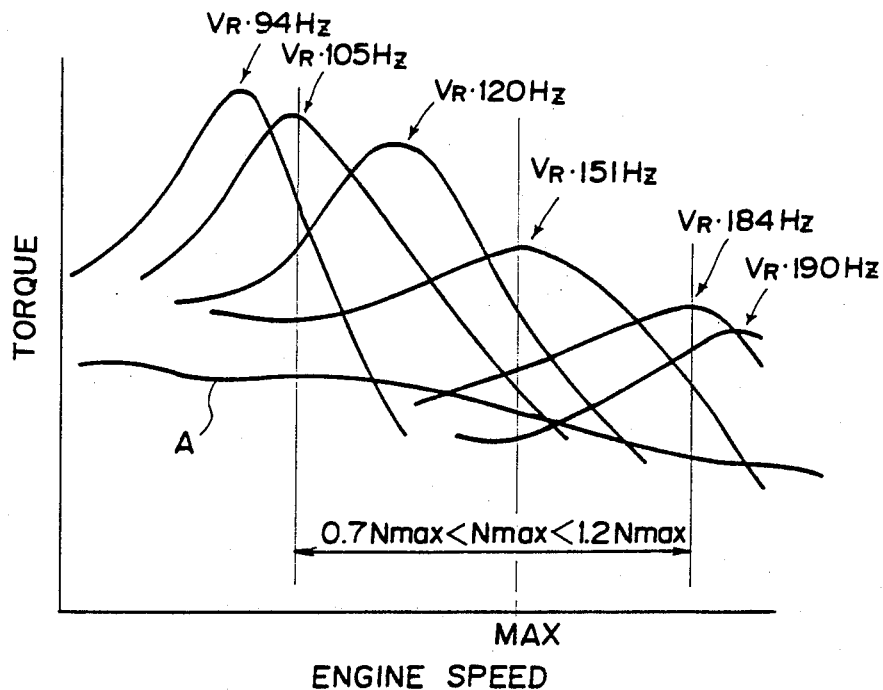
FIG. 3 shows engine output torque-engine speed characteristics for various values of the shorter passage resonance tuning engine speed $N_R$.

Engine output torque-engine speed characteristics were detected for various values of $V_R$, i.e., the shorter passage resonance tuning engine speed $N_R$. FIG. 3 shows the result. As can be understood from FIG. 3, when the shorter passage resonance tuning engine speed $N_R$ is not higher than 0.7 Nmax or not lower than 1.2 Nmax, engine output torque cannot be sufficiently high as compared with the case of common intake systems with neither inertia tuning effect nor resonance tuning effect represented by curve A in FIG. 3.

In this embodiment, the resonance tuning frequency is changed according to the engine speed by changing the cross-sectional area of the circular passage 6. This is advantageous in compactly arranging the engine over an intake system in which the resonance tuning frequency is changed by changing the length of the intake system. Further, the valves for changing the cross-sectional area of the circular passage 6 (the butterfly valves 14) are disposed in the downstream side communicating passage 9 in this embodiment. This is advantageous over the case where the valves are disposed in the upstream side communicating passage 8 in that flow of intake air introduced through the intake supply passage 10 and the upstream side communicating passage 8 is not affected by opening and closure of the valves.

Figure 4:
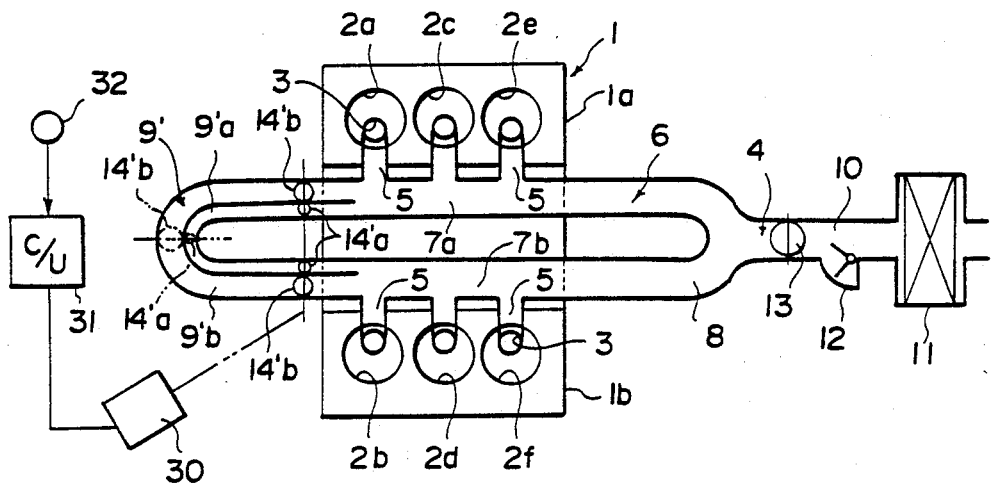
FIG. 4 is a view similar to FIG. 1 but showing another embodiment of the present invention.

FIG. 4 shows another embodiment of the present invention. In FIG. 4, the parts analogous to the parts shown in FIG. 1 are given the same reference numerals and will not be described here. In this embodiment, the downstream side communicating passage 9' comprises first and second communicating passages 9'a and 9'b extending in parallel to each other between the downstream side ends of the first and second branch passages 7a and 7b, the second communicating passage 9'b being larger than the first communicating passage 9'a in cross-sectional area. A pair of first butterfly valves 14'a are provided in the first communicating passage 9'a to be opened and closed in synchronization with each other, one near the junction of the downstream side communicating passage 9' to the first branch passage 7a and the other near the junction of the same to the second branch passage 7b. Further, a pair of second butterfly valves 14'b are provided in the second communicating passage 9'b to be opened and closed in synchronization with each other in positions corresponding to the first butterfly valves 14'a.

Figure 5:
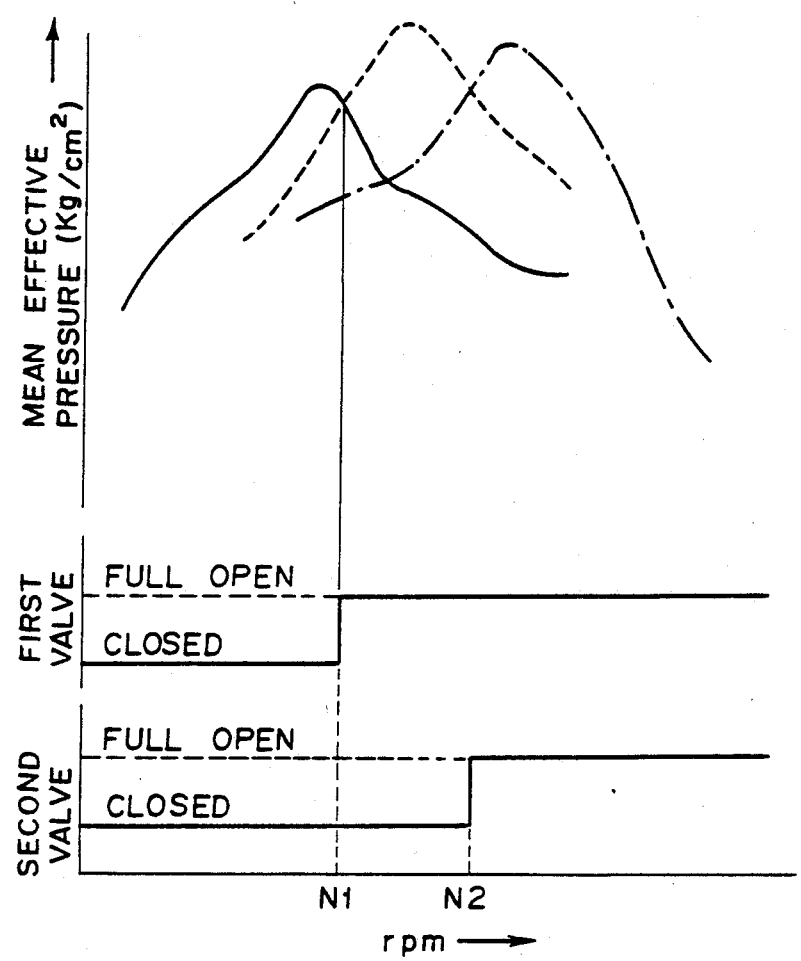
FIG. 5 shows a relation between the opening of the butterfly valves and the engine speed, and a relation between the mean effective pressure and the engine speed in the engine shown in FIG. 4, FIGS. 6A and 6B are schematic views for illustrating an example of valve means which can be employed in the present invention.

As shown in FIG. 5, the first butterfly valves 14'a are closed in the low engine speed range lower than a first preset speed N1 and are fully opened when the engine speed exceeds the first preset speed N1. The second butterfly valves 14'b are closed when the engine speed is lower than a second preset speed which is higher than the first preset speed and are fully opened in the high engine speed range higher than the second preset speed.

In the low engine speed range lower than the first preset speed N1, both the first and second butterfly valves 14'a and 14'b are closed and accordingly, the downstream side communicating passage 9' is completely closed. In this state, negative pressure wave generated near the intake port 3 for each cylinders in each cylinder bank at the beginning of the intake stroke of the corresponding cylinder propagates upstream through the upstream side communicating passage 8 and is reflected into positive pressure wave at the junction of the circular passage 6 to the intake air supply passage 10, and the positive pressure wave acts on the same cylinder at the end of the intake stroke to supercharge the cylinder by inertia effect of intake air. The intake system of this embodiment is arranged so that the mean effective pressure in each cylinder (corresponding to the engine output torque) reaches a peak in the low engine speed range lower than the first preset speed N1 in such an inertia tuning supercharging state as shown by the solid line in FIG. 5.

When the engine speed exceeds the first preset speed N1, the circular passage 6 is opened and a positive pressure wave generated near the intake port 3 for each cylinder in the each cylinder bank is propagated along the circular passage 6 through the upstream side communicating passage 8 and the downstream side communicating passage 9' in opposite directions and acts on the intake ports for the other cylinders in the same cylinder bank, thereby supercharging the cylinders by resonance tuning effect of intake air. However, in the intermediate speed range between the first and second preset speeds N1 and N2, the downstream side communicating passage 9' opens only through the first communicating passage 9'a and the resistance to the pressure wave is relatively high, and accordingly, the resonance tuning supercharging effect becomes maximum in the intermediate speed range as shown by the broken line in FIG. 5. On the other hand, in the high engine speed range higher than the second preset speed, both the first and second communicating passages 9'a and 9'b are opened and the resistance to the pressure wave is relatively low, and accordingly, the resonance tuning supercharging effect becomes maximum in the high engine speed range as shown by the chain line in FIG. 5. Thus the output torque characteristic is switched among three characteristics according to the engine speed range, and by the combination of the three characteristics, smooth torque characteristic can be obtained in totality.

Though, in the embodiment described above, each of the first and second communicating passages 9'a and 9'b is provided with a pair of butterfly valves at the junctions of the communicating passage to the first and second branch passages 7a and 7b, each communicating passage may be provided only one butterfly valve at the middle between the junctions as shown by the chain line in FIG. 4.

Further, though, in the embodiments described above, butterfly valves are used as the means for opening and closing the circular passage 6, other various valve means can be used. For example, honeycomb type shutter valves such as shown in FIGS. 6A and 6B, and 7A and 7B may be used.

Figure 6A:
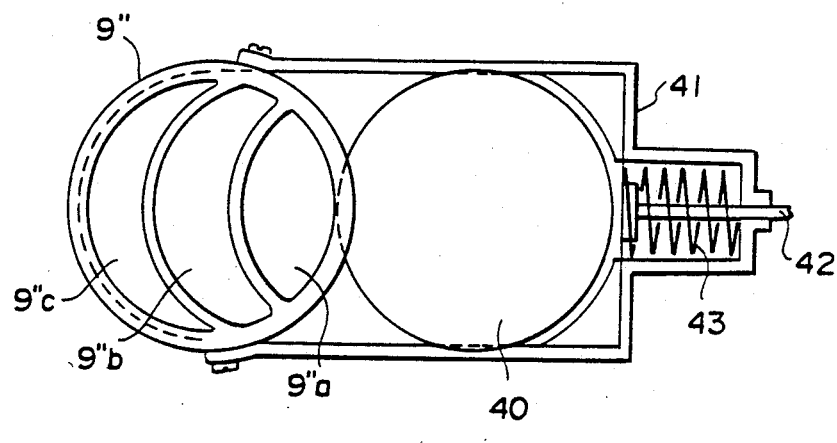
Figure 6B:
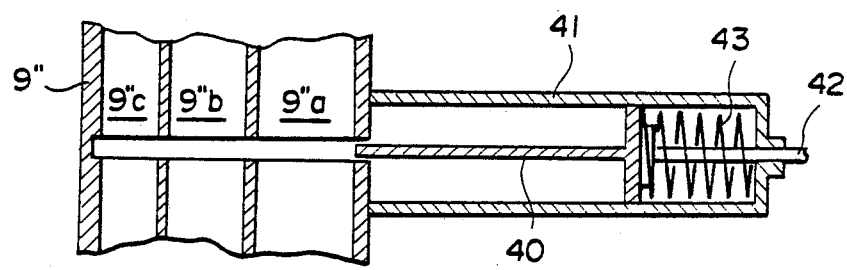

The shutter valve shown in FIGS. 6A and 6B comprises a disk-like valve body 40 which is mounted on the downstream side communicating passage 9" by way of a housing 41 to be slidable into and away from the downstream side communicating passage 9". The downstream side communicating passage 9" is divided into three sections 9"a, 9"b and 9"c. The valve body 40 is moved into the downstream side communicating passage 9" pushed by an actuator rod 42 to close the passage 9" and is moved in the reverse direction under the force of a return spring 43.

Figure 7A:
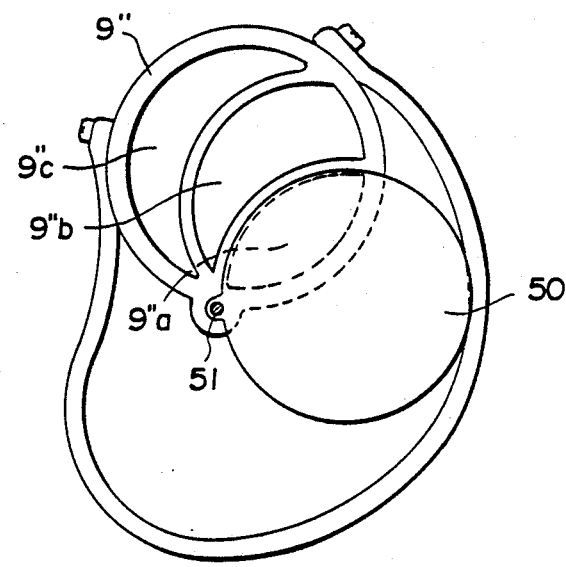
FIGS. 7A and 7B are schematic views for illustrating an example of valve means which can be employed in the present invention.
Figure 7B:
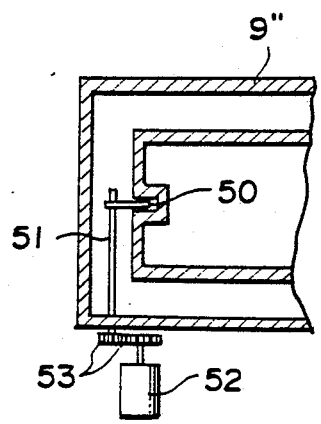

The shutter valve shown in FIGS. 7A and 7B comprises a disk-like valve body 50 to be pivoted about a shaft 51 into and away from the downstream side communicating passage 9" to close and open the communicating passage 9". The position of the valve body 50 is controlled by stepping motor 52 which connected to the shaft 51 by way of gears 53.

Figure 8:
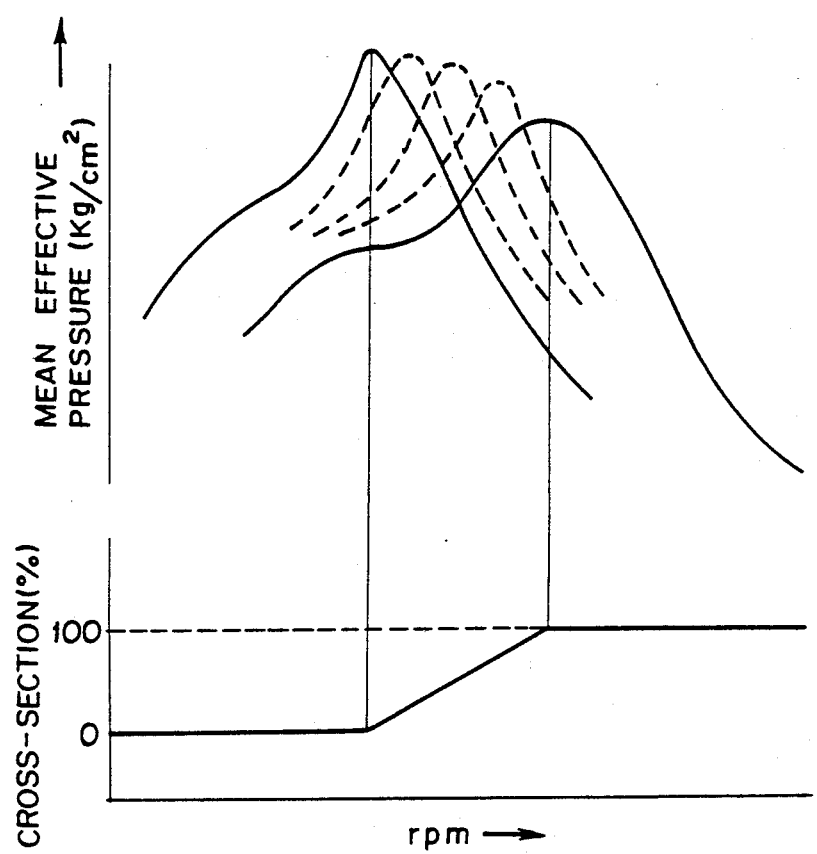
FIG. 8 is a view similar to FIG. 5 but for the intake system provided with the valve shown in FIGS. 6A and B or FIGS. 7A and 7B.

The opening of the shutter valve shown in FIGS. 6A and 6B or 7A and 7B is changed according to the engine speed as shown in FIG. 8, and the peak of the mean effective pressure in each cylinder shifted with the change of the opening of the shutter valve as shown in FIG. 8. Thus an effect similar to the embodiment shown in FIG. 1 can be obtained.

Figure 9:
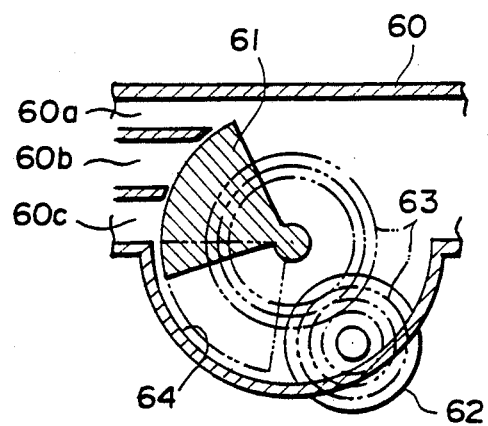
FIG. 9 is a schematic view showing a modification of the intake system shown in FIG. 4.

In the modification shown in FIG. 9, the downstream side communicating passage 60 comprises first to third sub-passages 60a, 60b and 60c, and a sector valve body 61 is mounted for rotation in the downstream side communicating passage 60. The sector valve body 61 is driven by a stepping motor 62 by way of gears 63 among a first position in which it closes all the sub-passages 60a, 60b and 60c of the downstream side communicating passage 60, i.e., completely closes the downstream side communicating passage 60, a second position in which it opens only the first sub-passage 60a, a third position in which it opens both the first and second sub-passages 60a and 60b, and fourth position in which it opens all the sub-passages 60a, 60b and 60c. In the fourth position, the sector valve body 61 is accommodated in a recess 64 formed on a side of the passage 60 not to interfere with propagation of the pressure wave.

Figure 10:
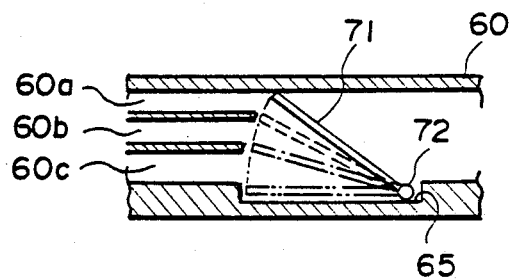
FIG. 10 is a schematic view showing another modification of the intake system shown in FIG. 4.

In the modification shown in FIG. 10, a plate-like valve body 71 is used in place of the sector valve body 61 in the modification shown in FIG. 9. The plate-like valve body 71 is pivoted about a shaft 72 among a first position in which it closes all the sub-passages 60a, 60b and 60c of the downstream side communicating passage 60, i.e., completely closes the downstream side communicating passage 60, a second position in which it opens only the first sub-passage 60a, a third position in which it opens both the first and second sub-passages 60a and 60b, and fourth position in which it opens all the sub-passages 60a, 60b and 60c. In the fourth position, the sector valve body 71 is accommodated in a recess 65 formed on a side of the passage 60 not to interfere with propagation of the pressure wave.

Though, in the embodiments described above, the intake system of the present invention is applied to a V-6 engine, the intake system of the present invention may also be applied other multiple-cylinder engines.

We claim:

1. An intake system for a multiple-cylinder engine having a plurality of cylinders comprising first and second branch passages, a plurality of discrete intake passages for connecting the cylinders to one of the first and second branch passages, an intake air supply passage, an upstream side communicating passage for communicating the first and second branch passages with each other and with the downstream end of the intake air supply passage, and a downstream side communicating passage comprising a plurality of sub-passages separated by partition walls for communicating the downstream side ends of the first and second branch passages with each other, the firing order being set so that the cylinders connected to the first branch passage by way of the respective discrete passages do not fire one after another and cylinders connected to the second branch passage by way of the respective discrete passages do not fire one after another, and the first and second branch passages and the upstream side and downstream side communicating passages forming a circular passage for supercharging the engine by resonance tuning effect of intake air, characterized in that said downstream side communicating passage is provided with a cross-sectional area changing means including a valve means which selectively opens and closes the sub-passages for switching the effective cross-sectional area of the downstream side communicating passage among at least a full closed state, a part opening state and a full opening state according to the engine speed to increase the effective cross-sectional area of the downstream side communicating passage with increase in the engine speed.

2. An intake system as defined in claim 1 in which said multiple-cylinder engine is a V-type engine having first and second cylinder banks, the cylinders in the first cylinder bank being connected to the first branch passage by way of the discrete intake passages and the cylinders in the second cylinder bank being connected to the second branch passage by way of the discrete intake passage.

3. An intake system as defined in claim 1 said valve means is a rotary valve opposed to one ends of the partition walls.

4. An intake system as defined in claim 1 in which each of said sub-passages is provided with a shutter valve.

5. An intake system as defined in claim 1 in which a shorter passage resonance tuning engine speed $N_R$ when the valve means are fully opened is lower than 1.2 times the maximum engine speed and higher than 0.7 times the maximum engine speed, the shorter passage resonance tuning engine speed $N_R$ being the resonance tuning engine speed of the shorter one of the passage between the junction of the upstream-most discrete passage in one of the cylinder banks to the corresponding branch passage and the junction of the circular passage to the intake air supply passage and the passage between the junction of the downstream-most discrete passage in the cylinder bank to the same branch passage and the middle of the downstream side communicating passage.

6. A V-type engine having a pair of cylinder banks, in which the intake-stroke alternately occurs in the cylinder banks, a circular resonance intake passage is provided between the cylinder banks, discrete intake passages connecting the respective cylinders in the cylinder banks to the circular resonance intake passage are provided, an intake air supply passage is connected to the circular resonance intake passage between the cylinder banks at a downstream end of the intake air passage and is provided with an air cleaner in a downstream end portion thereof, the inertia tuning engine speed determined by the length of the discrete intake passages the volume of each cylinder, and the intake value opening time is set to be not lower than the maximum engine speed, the downstream side portion of the circular resonance intake passage between the junctions of the downstream-most discrete intake passages for the cylinders in the respective cylinder banks includes at least a pair of communicating passages and is provided with a valve means which selectively opens and closes the communicating passages for changing the cross-sectional area of the downstream side portion, and valve drive means for controlling the valve means to switch the effective cross-sectional area of the downstream side portion among at least a full closed state, a part opening state and a fully opening state according to the engine speed to increase the effective cross-sectional area of the downstream side portion with increase in the engine speed is provided.

* * * * *